US011834185B2

United States Patent
Carson et al.

(10) Patent No.: US 11,834,185 B2
(45) Date of Patent: Dec. 5, 2023

(54) EJECTION SEAT PARACHUTE DEPLOYMENT SYSTEMS AND METHODS

(71) Applicant: Rockwell Collins, Inc., Cedar Rapids, IA (US)

(72) Inventors: Kassidy L. Carson, Colorado Springs, CO (US); John Hampton, Colorado Springs, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 17/665,368

(22) Filed: Feb. 4, 2022

(65) Prior Publication Data
US 2023/0249836 A1  Aug. 10, 2023

(51) Int. Cl.
  *B64D 17/56* (2006.01)
  *B64D 25/10* (2006.01)

(52) U.S. Cl.
  CPC .............. *B64D 17/56* (2013.01); *B64D 25/10* (2013.01)

(58) Field of Classification Search
  CPC .............................. B64D 17/56; B64D 25/10
  See application file for complete search history.

(56) References Cited

U.S. PATENT DOCUMENTS

| | | | | |
|---|---|---|---|---|
| 3,191,892 A | * | 6/1965 | Greene, Jr. | B64D 25/10 244/122 AE |
| 3,596,856 A | | 8/1971 | Drew | |
| 3,669,388 A | * | 6/1972 | Van Kreuningen | B64D 25/00 244/138 R |
| 4,057,206 A | * | 11/1977 | Duncan | B64D 25/10 73/204.19 |
| 4,505,444 A | | 3/1985 | Martin | |
| 4,603,823 A | | 8/1986 | Ayoub | |
| 4,749,153 A | | 6/1988 | Herndon | |
| 4,765,570 A | * | 8/1988 | Herndon | B64D 25/10 D12/345 |
| 5,222,695 A | * | 6/1993 | Lake | B64D 25/10 244/122 AE |

FOREIGN PATENT DOCUMENTS

GB     2120612 A  * 12/1983  ............. B64D 25/10

OTHER PUBLICATIONS

United Kingdom Intellectual Property Office, United Kingdom Search Report dated Aug. 16, 2023 in Application No. GB2031291.7.

* cited by examiner

*Primary Examiner* — Richard G Davis
(74) *Attorney, Agent, or Firm* — SNELL & WILMER L.L.P.

(57) ABSTRACT

An article of manufacture may include a tangible, non-transitory computer-readable storage medium having instructions stored thereon that, in response to execution by a processor, cause the processor to perform operations comprising: receiving, via the processor, an ejection command for ejecting an ejection seat from an aircraft; determining, via the processor, an aircraft or ejection seat altitude and an aircraft or ejection seat speed; and commanding, via the processor, a simultaneous or staged deployment of a drogue parachute and a main parachute upon or just prior to separation of the ejection seat from the aircraft, the simultaneous or staged deployment being described herein.

17 Claims, 7 Drawing Sheets

EJECTION SEAT PARACHUTE DEPLOYMENT SYSTEMS AND METHODS

FIELD

The present disclosure relates to escape systems, and more specifically, to ejection seat parachute deployment systems and methods for aircraft ejection seats.

BACKGROUND

Ejection seating systems typically have two parachute sub-systems, a drogue parachute, and a main recovery parachute. The drogue parachute is deployed attached to the seat to stabilize and slow down the seat in modes of operation where it is not yet safe to deploy the main recovery parachute. The main recovery parachute deploys attached to the ejection seat occupant to separate the occupant from the seat and descend them safely to the ground. Modes of operation for the ejection seat historically have taken either a universal or binary approach to parachute sub-system deployments.

Where a binary approach is used the recovery parachute is either deployed immediately upon escaping the cockpit at lower speeds and altitudes (and drogue is unused), or the drogue parachute is deployed immediately upon escaping the cockpit at higher speeds and altitudes and releases after a period of time followed by main recovery parachute deployment with minimal or no overlap. Where a universal approach is applied, the drogue parachute is always deployed from the seat regardless of speed, and the subsequent parachute deployment and drogue deployment are timed in succession depending on the speed.

SUMMARY

An article of manufacture is disclosed herein. The article of manufacture may include a tangible, non-transitory computer-readable storage medium having instructions stored thereon that, in response to execution by a processor, cause the processor to perform operations comprising: receiving, via the processor, an ejection command for ejecting an ejection seat from an aircraft; determining, via the processor, an aircraft altitude and an aircraft speed; and commanding, via the processor, a simultaneous deployment of a drogue parachute and a main parachute upon separation of the ejection seat from the aircraft, the simultaneous deployment being between 0 and 150 milliseconds from one another.

In various embodiments, the operations further comprise commanding, via the processor, separation of the drogue parachute after a time threshold measured from the simultaneous deployment. The time threshold may be between 100 milliseconds and 400 milliseconds.

In various embodiments, the operations further comprise determining the aircraft altitude and the aircraft speed are within a predetermined zone. The predetermined zone may comprise an aircraft speed range between 25 knots and 300 knots and an aircraft altitude range between 0 feet (0 meters) and 20,000 feet (6,096 meters). A first threshold speed to be considered within the predetermined zone may decrease as altitude increases.

In various embodiments, the simultaneous deployment is between 0 milliseconds and 100 milliseconds.

In various embodiments, the operations further comprise deploying the drogue parachute prior to deploying the main parachute.

In various embodiments, the operations further comprise determining, via the processor, the ejection seat has separated from the aircraft prior to the simultaneous deployment.

An ejection seat is disclosed herein. The ejection seat may comprise: a seat back; a drogue parachute stowed in or on the seat back; a main parachute stowed in or on the seat back; a processor; and a tangible, non-transitory computer-readable storage medium having instructions stored thereon that, in response to execution by the processor, cause the processor to perform operations comprising: determining, via the processor, whether the aircraft is within a predetermined zone, the predetermined zone including a speed range and an altitude range, and commanding, via the processor, simultaneous deployment of the drogue parachute and the main parachute from the seat back upon separation of the ejection seat from the aircraft in response to determining the aircraft is within the predetermined zone, the simultaneous deployment being between 0 and 150 milliseconds from one another.

In various embodiments, the operations further comprise commanding, via the processor, separation of the drogue parachute after a time threshold measured from the simultaneous deployment. The time threshold may be between 100 milliseconds and 400 milliseconds.

In various embodiments, the operations further comprise: receiving, via the processor, sensor data from at least two sensors; and determining, via the processor, an aircraft speed and an altitude of the aircraft based on the sensor data. In various embodiments, the operations further comprise determining whether an aircraft speed and an altitude of the aircraft are within the predetermined zone prior to ejection of the ejection seat.

An aircraft is disclosed herein. The aircraft may comprise: an ejection seat, including: a first sensor; a second sensor; a drogue parachute stowed in or on the ejection seat; a main parachute stowed in or on the ejection seat; a processor in electronic communication with the first sensor and the second sensor; a tangible, non-transitory computer-readable storage medium having instructions stored thereon that, in response to execution by the processor, cause the processor to perform operations comprising: determining, via the processor and based on sensor data received from the first sensor and the second sensor, whether the aircraft is within a predetermined zone, the predetermined zone including a speed range and an altitude range, and commanding, via the processor, simultaneous deployment of the drogue parachute and the main parachute from the ejection seat upon separation of the ejection seat from the aircraft in response to determining the aircraft is within the predetermined zone, the simultaneous deployment being between 0 and 150 milliseconds from one another.

In various embodiments, the operations further comprise commanding, via the processor, separation of the drogue parachute after a time threshold measured from the simultaneous deployment.

In various embodiments, the operations further comprise commanding, via the processor, deployment of only the main parachute in response to determining the aircraft is in a second zone having a speed less than a speed threshold of the speed range and an altitude less than a maximum altitude of the altitude range. The operations may further comprise deploying the drogue parachute first, severing the drogue parachute, and deploying the main parachute after severing the drogue parachute in response to determining the aircraft is in a third zone.

In various embodiments, the first sensor is a dynamic pressure sensor and the second sensor is a static pressure sensor. The operations may further comprise: determining, via the processor, a speed of the ejection seat based on a first pressure data received from the dynamic pressure sensor and the static pressure sensor; and determining, via the processor, an altitude of the aircraft based on a second pressure data received from the static pressure sensor; and determining, via the processor, whether the ejection seat is in the predetermined zone based on the altitude and the speed of the ejection seat.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein refers to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

The binary approach to parachute sub-system deployment, usually bifurcated along an equivalent airspeed and altitude mode boundary line or curve, can result in a harsh cut-over between deployment modes. In particular, along a higher end of the lower speed/altitude mode lacks a drogue stabilization and deceleration phase and can have high main recovery parachute opening shock loads resulting in higher probability of injury. This trade-off has historically been made in favor of biasing for improved terrain clearance performance (i.e., the ability to recover the occupant when ejecting with low clearance to ground level at time of ejection).

The universal approach of always deploying the drogue regardless of speed and timing the subsequent main recovery parachute deployment and drogue deployment along one or more equivalent airspeed and altitude mode boundary line(s) or curve(s) sacrifices optimization of overall seat stability, injury performance, and terrain clearance.

An ejection seat deployment system for use in an aircraft ejection system is disclosed herein. The ejection seat deployment system comprises a sequence controller, a sequence power source, sensor(s), a drogue parachute, a main parachute, and related deployment and separation mechanisms. In various embodiments, the sensor(s) comprise on or more dynamic pressure sensors (e.g., a differential pressure sensor, a transducer, or the like) and one or more static pressure sensors (e.g., an altimeter, a barometer, a transducer, or the like). In various embodiments, the ejection seat deployment system eliminates the harsh cutover from low altitude/slow speed to fast speed/high altitude mode of operation in the binary ejection systems, reducing the injury risk due to pitch and yaw instability and high parachute opening shock loads associated with the upper end of the conventional low altitude/slow speed mode boundary. The ejection seat deployment system disclosed herein can provide pitch and yaw stabilization and deceleration via the drogue parachute that is complimentary to the main recovery parachute and can be optimized to be provide neutral impact and in some cases improvements to terrain clearance at intermediate ejection speeds, in accordance with various embodiments. In various embodiments, use of the ejection seat deployment system can result in fewer ejection scenarios where there is a drogue deployment rocket or cartridge remaining unfired upon seat ground impact.

The ejection seat deployment system can avoid the pitfalls of the universal sequence systems, reducing the risk of parachute entanglement and terrain clearance loss at the lower end of the conventional low altitude/slow speed mode boundary.

Figure 1:
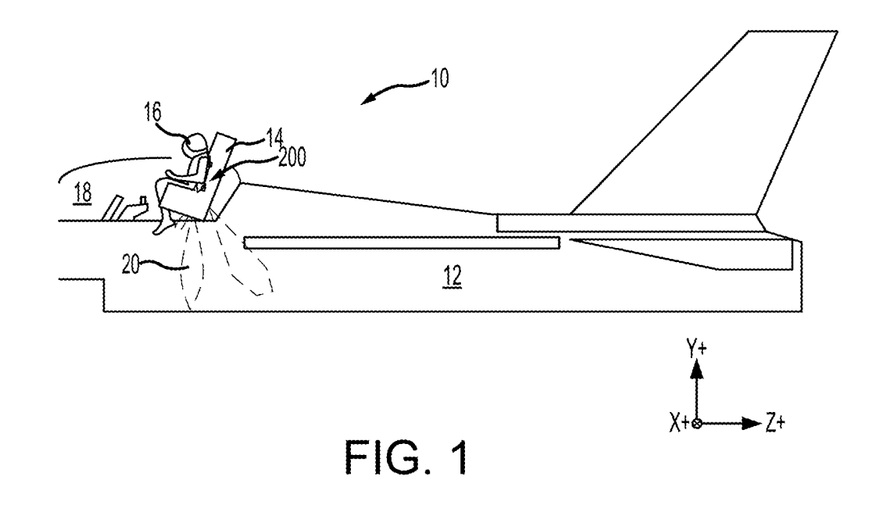
FIG. 1 illustrates an aircraft ejection system, in accordance with various embodiments.

With reference to FIG. 1, an aircraft ejection system of an aircraft 10 is shown, in accordance with various embodiments. Aircraft ejection system of an aircraft 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes an ejection seat deployment system 200. The ejection seat deployment system 200 may be configured to initiate a sequence of ejection events after the ejection seat has been expelled from the aircraft 12.

Figure 2:
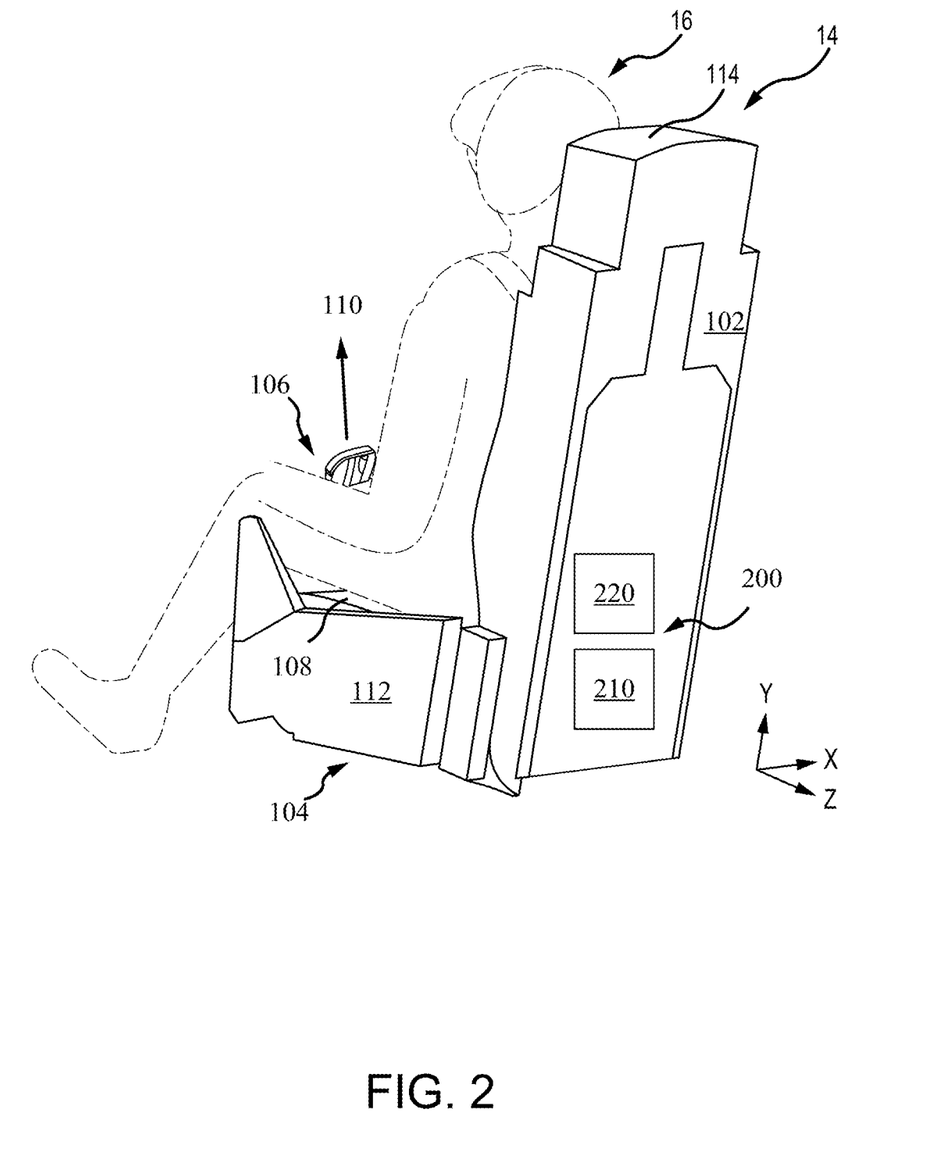
FIG. 2 illustrates an ejection seat having an ejection seat sequencing system, in accordance with various embodiments.

With additional reference to FIG. 2, ejection seat 14 is illustrated with an ejection seat deployment system 200, in accordance with various embodiments. Ejection seat 14 includes a seat back 102 and a seat bucket 104. The ejection seat deployment system 200 comprises a drogue parachute 210 and a main parachute 220. The drogue parachute 210 and the main parachute 220 are stowed in or on the ejection seat 14 during normal operation (e.g., in or on the seat back 102, the seat bucket 104, or the like). In various embodiments, an ejection handle 106 may be located proximate a front 108 of seat bucket 104. Front 108 of seat bucket 104 is generally opposite, or distal, seat back 102. While FIG. 2 shows ejection handle 106 located at front 108 of seat bucket 104, it is further contemplated and understood that ejection handle 106 may be located anywhere that is accessible to an occupant of ejection seat 14. For example, ejection handle 106 may be located on a side or multiple sides of 112 of seat bucket 104 or a headrest 114 of seat back 102.

Ejection handle 106 may be configured to initiate an ejection sequence upon actuation. For example, occupant 16 pulling ejection handle 106 in the direction of arrow 110 may activate a rocket catapult assembly coupled to seat back 102 of the ejection seat 14.

In response to activation, a catapult cartridge unit may ignite and tend to produce relatively hot, high pressure, gas. A breach may be coupled to the aircraft 12 and comprise a mortar tube disposed within the mortar assembly of the rocket catapult assembly. In various embodiments, the mortar cap assembly may direct a first portion of gas to the breach tending thereby to drive the mortar tube outward of the mortar assembly and cause ejection seat 14 to be expelled from cockpit 18. In various embodiments, upon ejection, depending on an ejection mode as described further herein, the drogue parachute 210 and/or the main parachute 220 are deployed in a predetermined sequence. In various embodiments, the predetermined sequence is based on an altitude of the aircraft 10 at a time of ejection and a speed of the ejection seat at a time of deployment. In this regard, the sequence may be determined based on static pressure data and dynamic pressure data, in accordance with various embodiments, as described further herein.

Figure 3:
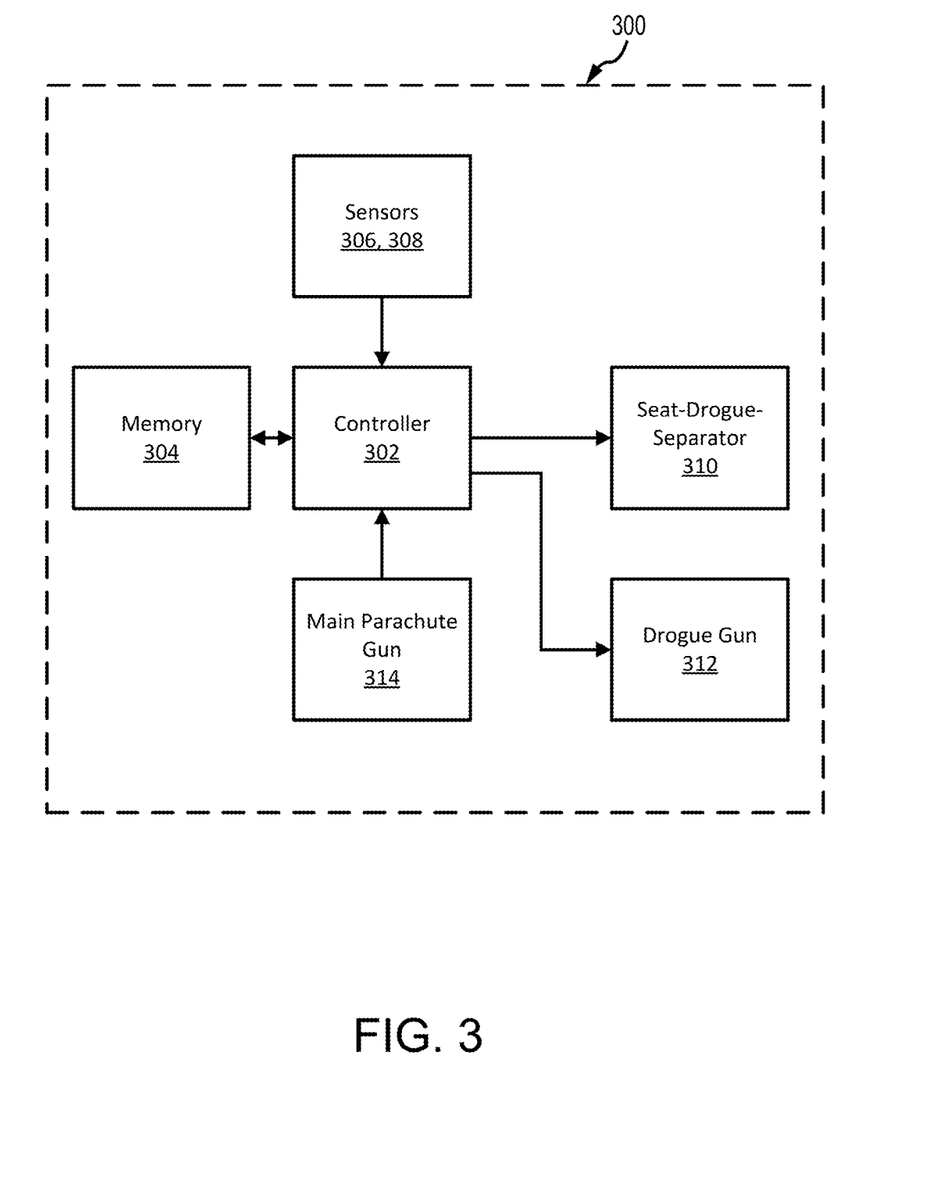
FIG. 3 illustrates a control system for an ejection seat deployment system, in accordance with various embodiments.

Referring now to FIG. 4, a schematic block diagram of a control system 300 for the ejection seat deployment system 200 of the aircraft ejection system of the aircraft 10 is illustrated, in accordance with various embodiments. Control system 300 includes a sequence controller 302 in electronic communication with sensors 306, 308. In various embodiments, sequence controller 302 may be integrated into computer systems of ejection seat 14. In various embodiments, sequence controller 302 may be configured as a central network element or hub to access various systems and components of control system 300. In various embodiments, sequence controller 302 may comprise a processor. In various embodiments, sequence controller 302 may be implemented in a single processor. In various embodiments, sequence controller 302 may be implemented as and may include one or more processors and/or one or more tangible, non-transitory memories (e.g., memory 304) and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Sequence controller 302 may comprise a processor configured to implement various logical operations in response to execution of instructions, for example, instructions stored on a non-transitory, tangible, computer-readable medium (e.g., memory 304) configured to communicate with sequence controller 302.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijiten to fall outside the scope of patentable subject matter under 35 U.S.C. § 101.

In various embodiments, sequence controller 302 may be in electronic communication with sensors 306, 308. Sensor 306, 308 may be disposed on a wing of the aircraft 10, on the parachute container 222 of an ejection seat 14, or the like in accordance with various embodiments. For example, sensor 306 may comprise a static pressure sensor (e.g., an altimeter, a barometer, or any other sensor configured for use in determining an altitude of an aircraft 10). In various embodiments, sensor 308 is configured to provide sensor data corresponding to a speed of an aircraft or ejection seat. For example, sensor 308 may comprise a dynamic pressure sensor (e.g., to provide data to be used with static pressure data of sensor 306 for airspeed calculation), an optical sensor (e.g., a light detection and ranging (LiDAR) sensor, a photonic sensor or the like). Any sensor, or sensors configured for providing data to determine airspeed are within the scope of this disclosure. Based on the variable data measured from the sensors 306, 308 and receiving an ejection command, the sequence controller may initiate a sequence of ejection events as described further herein.

In various embodiments, the control system 300 of the ejection seat deployment system 200 further comprises a seat-drogue-separator 310, a drogue gun, rocket, mortar, or the like 312 and a main parachute gun 314 (or mortar). The drogue gun 312 is configured to deploy the drogue parachute 210 from the ejection seat 14 of FIG. 2 from a stowed state (e.g., FIG. 2) to a deployed state (e.g., FIG. 5A). Similarly, the main parachute gun 314 is configured to deploy the main parachute 220 from a stowed state (e.g., FIG. 2) to a deployed state (e.g., FIG. 5A). The seat-drogue-separator 310 is configured to deploy the drogue parachute 210 from the ejection seat 14 during an ejection event (e.g., as shown in FIG. 5B). In various embodiments, the seat-drogue-separator 310 may comprise any separation mechanism known in the art, such as a guillotine, a release latch, a shape charge, or the like. The present disclosure is not limited in this regard. As described further herein, in response to the ejection command, or any other reference control signal indicating an ejection event is occurring or the ejection seat 14, and based on at least two variables from the sensors 306, 308, the sequence controller 302 may perform process 400 in FIG. 4 as described further herein.

Although illustrated as including the seat-drogue-separator 310, the drogue gun 312, the main parachute gun 314, the present disclosure is not limited in this regard. For example, the control system 300 may further include a stabilization system firing, a supplemental propulsion system firing, or any other ejection seat system known in the art.

Figure 4:
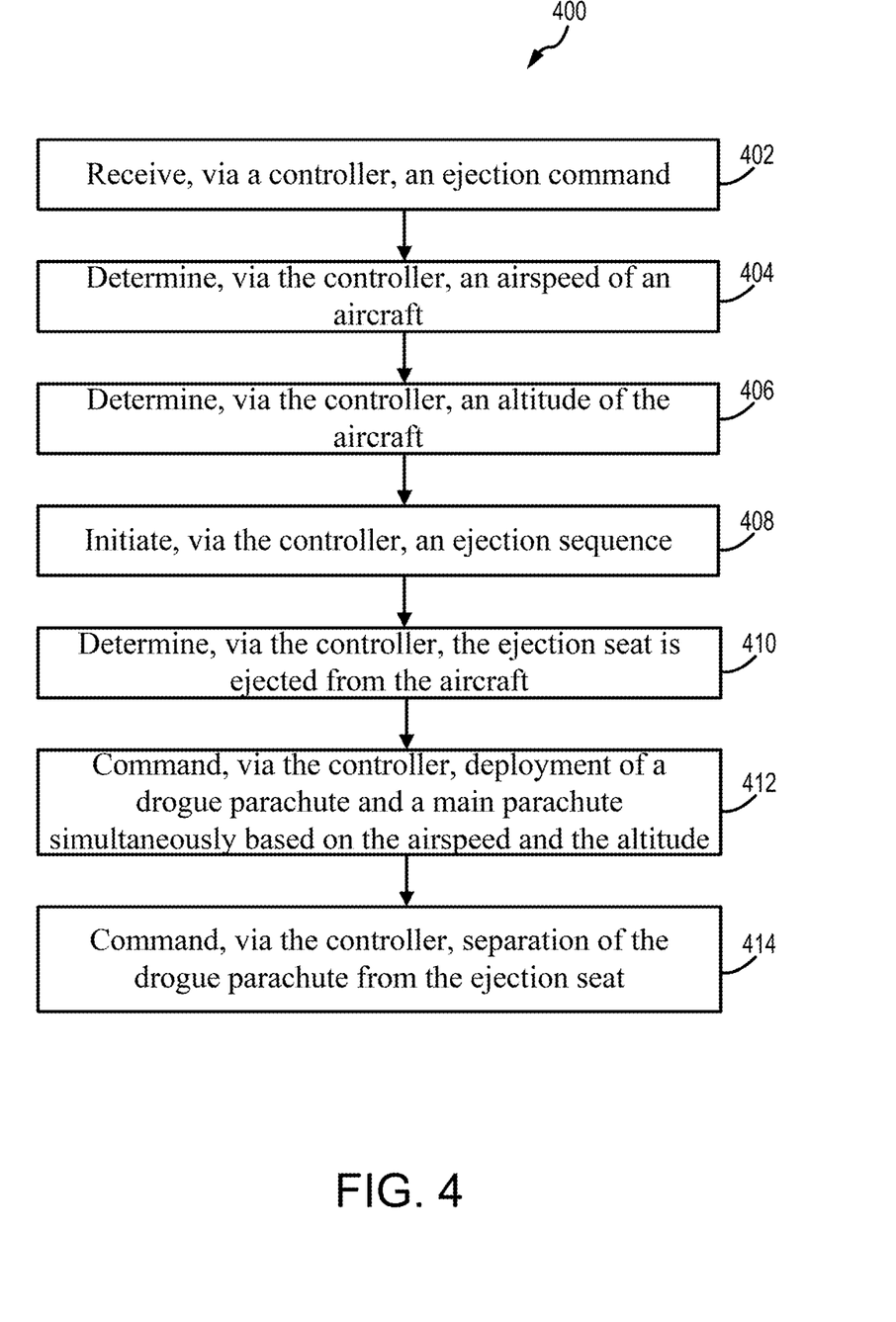
FIG. 4 illustrates a process performed by the control system of FIG. 3, in accordance with various embodiments.
Figure 5A:
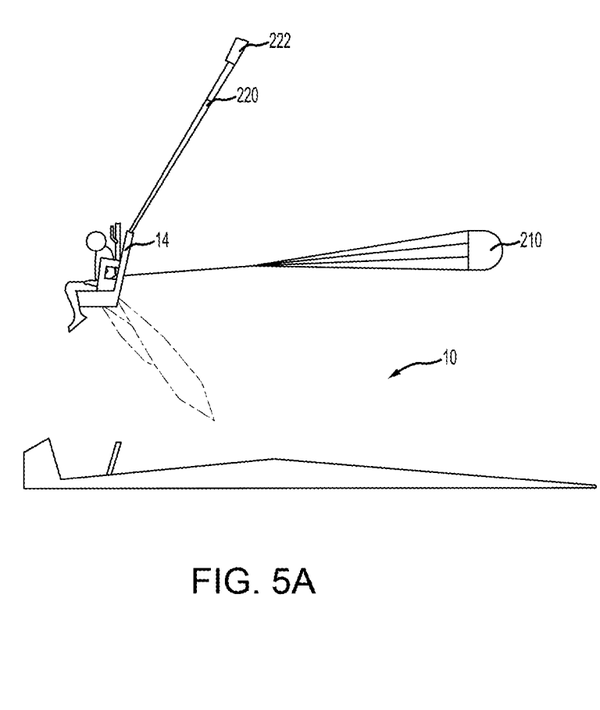
FIG. 5A illustrates an ejection seat after deployment, in accordance with various embodiments.
Figure 5B:
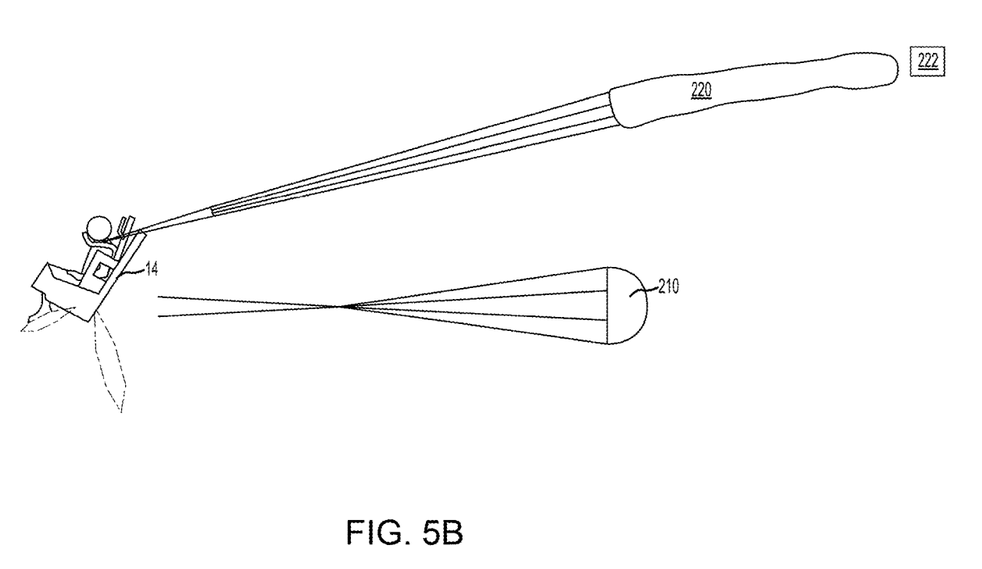
FIG. 5B illustrates an ejection seat after deployment and severance of a drogue parachute, in accordance with various embodiments.

Referring now to FIG. 4, a process 400 performed by the control system 300 of the ejection seat deployment system 200 for an ejection seat 14 of an aircraft 10 is illustrated, in accordance with various embodiments. The process 400 comprises receiving, via a controller 302, an ejection command (step 402). The ejection command may be received in response to an ejection handle 106 of the ejection seat 14 being pulled (e.g., in the direction of arrow 110). In response to receiving the ejection command, the process 400 may make some preliminary determinations in order to determine an appropriate ejection sequence.

For example, the process 400 further comprises determining, via the controller 302, an airspeed of the aircraft or the ejection seat (step 404). The airspeed may be determined based on sensor data received from sensor 306 and/or sensor 308. For example, airspeed can be calculated based on a pressure differential in response to sensors 306, 308 being a dynamic/static pressure sensor, in accordance with various embodiments. Airspeed may be converted to equivalent airspeed based on calculating a density from an altitude determined from a static pressure sensor, in accordance with various embodiments. In response to sensor 308 being an optical sensor, the controller 302 may calculate an airspeed based on the optical sensor data. The present disclosure is not limited in this regard.

The process 400 further comprises determining, via the controller, an altitude of the aircraft or ejection seat (step 406). The altitude may be determined based on sensor data from sensor 306. For example, sensor 306 may comprise a static pressure sensor configured to measure static pressure proximate the aircraft 10. In this regard, in response to receiving static pressure data, the controller 302 can determine an equivalent altitude of the aircraft 10 (e.g., via an atmospheric pressure vs elevation curve), in accordance with various embodiments.

The process 400 further comprises initiating, via the controller 302, an ejection sequence (step 408). The ejection sequence may include igniting a catapult cartridge unit to initiate a rocket catapult assembly to eject the ejection seat 14 out of the aircraft 10, in accordance with various embodiments.

The process 400 further comprises determining, via the controller 302, the ejection seat 14 is ejected from the aircraft 10 (step 410). The controller 302 may determine ejection has occurred based on a predetermined time elapsing from the ejection command in step 402, based on receiving a reference signal (e.g., from a non-contact sensor or the like just prior to ejection), or the like. The present disclosure is not limited in this regard and one skilled in the art may recognize various potential reference points to initiate the following deployment sequence from and be within the scope of this disclosure.

The process 400 further comprises commanding, via the controller 302, deployment of a drogue parachute 210 and a main parachute 220 simultaneously based on the airspeed and the altitude being a predetermined zone (e.g., Zone 1B from FIG. 6) (step 412). In various embodiments, "simultaneously" as referred to herein is within 150 milliseconds, or within 125 milliseconds, or within 100 milliseconds, in accordance with various embodiments. In various embodiments, deployment of the drogue parachute 210 and the main parachute 220 may occur upon separation of the ejection seat 14 from the aircraft 10. Separation from the aircraft 10 by the ejection seat 14 may be determined based on a time elapsing from the ejection command in step 402, based on sensors disposed on ejection seat 14 providing sensor data to the controller 302, based on a reference signal during the ejection process (e.g., from a non-contact sensor passing reader on an ejection rail during ejection), or the like. The present disclosure is not limited in this regard. In various embodiments, the drogue parachute 210 may be deployed slightly before the main parachute 220. In various embodiments, in response to the drogue parachute 210 being deployed slightly before the main parachute 220, the main parachute 220 is still deployed within the "simultaneous range" (e.g., between 0 and 150 milliseconds, or between 0 and 125 milliseconds, or between 0 and 100 milliseconds after the drogue parachute 210).

Figure 6:
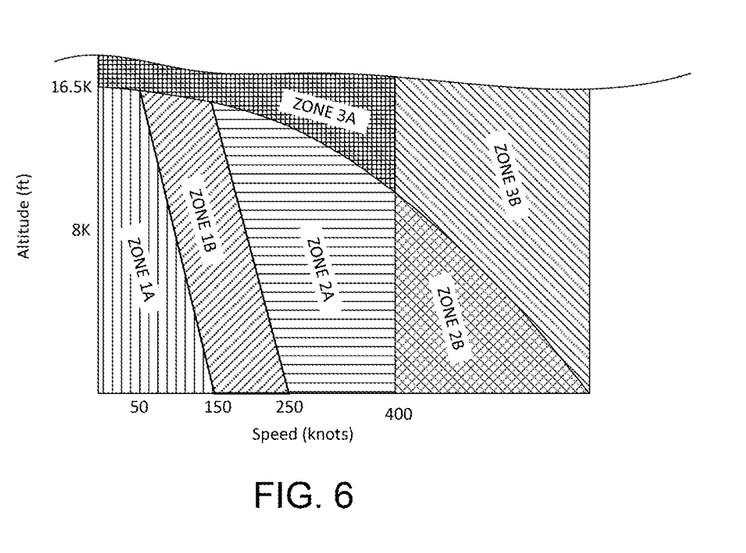
FIG. 6 illustrates a chart of altitude as and aircraft speed for various ejection sequence modes, in accordance with various embodiments.

In various embodiments, the predetermined zone (e.g., Zone 1B) from FIG. 1 is within an aircraft speed range (e.g., between 50 knots and 250 knots) and in a predetermined altitude range (e.g., between 0 feet and 16,500 feet) as shown in Zone 1B from FIG. 1. In various embodiments, a first threshold speed of the aircraft 10 to be considered in Zone 1B and not Zone 1A may decrease or stay the same as altitude increases (e.g., from 150 knots to 50 knots). Similarly, a second threshold speed of the aircraft 10 to be considered in Zone 1B and not Zone 2A may decrease or stay the same as altitude increases (e.g., from 250 knots to 150 knots). The various zones in FIG. 6 are shown for illustrative purposes and not meant to be limiting in any manner. For example, the deployment process disclosed herein may be incorporated for Zones 1A and 2A and still be within the scope of this disclosure. In various embodiments, by having Zone 1B a deployment process specific to Zone B, disclosed the deployment process may provide pitch and yaw stabilization and deceleration via the drogue parachute 210 that is complimentary to the main parachute 220, in accordance with various embodiments. In various embodiments, the speed ranges to be in zone 1B may range from 25 knots to 300 knots, or from 30 knots to 275 knots, or from 50 knots to 250 knots. In various embodiments, the altitude ranges to be in Zone 1B may be between 0 ft (0 m) and 20,000 (6,096 m) or between 0 ft and 18,000 ft (5,486 m) or between 0 ft and 16,500 ft, (5,029 m), or between 0 ft and 13,500 ft (4,115 m).

In various embodiments, prior to commanding the process 400 further comprises commanding, via the controller 302, separation of the drogue parachute 210 from the ejection seat 14 after a time threshold (step 414). In various embodiments, the drogue parachute 210 may be separated from the ejection seat 14 via the seat-drogue-separator 310. In various embodiments, the time threshold is between 100 milliseconds and 400 milliseconds of deployment of the main parachute 220, or between 150 milliseconds and 350 milliseconds, or between 300 milliseconds and 400 milliseconds. In this regard, the drogue parachute 210 may be utilized in conjunction with the main parachute 220 to provide pitch and yaw stabilization and enhanced deceleration in a transition altitude/speed zone between zone 1A and 1B, in accordance with various embodiments.

In various embodiments, with reference to FIG. 6, the controller 302 may further be configured to initiate a deployment sequence in step 408 of process 400 based on a speed of the aircraft 10 and an altitude of the aircraft 10 just prior to ejection. In this regard, the controller 302 may command deployment of only the main parachute 220 in response to being in Zone 1A, in accordance with various embodiments. The controller 302 may command deployment of the drogue parachute 210 first, severance of the drogue parachute 210 after a period of time (e.g., 1-1.2 seconds), followed by deployment of the main parachute 220 in response to being in Zone 2A. In response to being in Zone 2B, the controller 302 may command deployment of the drogue parachute 210 first, severance of the drogue parachute 210 after a long period of time (e.g., longer than in Zone 2A, 1.2-1.5 seconds for example), followed by deployment of the main parachute 220. In response to being in Zone 3A/3B, the controller 302 may command deployment of the drogue parachute 210 first for a long period of time (e.g., similar to Zone 2B), delayed severance and deployment of main parachute 220 until a threshold static pressure (e.g., equivalent pressure altitude) is determined.

In various embodiments, the process 400 provides a new mode of operation between a potentially harsh cutover between Zone 1A and Zone 2A or Zone 3A that may reduce an injury risk due to yaw instability and/or high parachute opening shock loads. In various embodiments, the process 400 provides a mode of operation that provides pitch and yaw stabilization and deceleration via the drogue parachute 210 that is complimentary to the main parachute and can be optimized to provide neutral impact and in some cases improvements to terrain clearance at intermediate ejection speeds. In various embodiments, the process 400 may result in fewer ejection scenarios where there is a drogue deployment rocket or cartridge remaining unfired upon seat ground impact. In various embodiments, the process 400 may avoid pitfalls of the universal approach mentioned previously herein by reducing a risk of parachute entanglement and terrain clearance loss at the lower end of Zone 1A.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An article of manufacture including a tangible, non-transitory computer-readable storage medium having instructions stored thereon that, in response to execution by a processor, cause the processor to perform operations comprising:
    receiving, via the processor, an ejection command for ejecting an ejection seat from an aircraft;
    determining, via the processor, an aircraft altitude or ejection altitude and an aircraft speed or an ejection seat speed;
    commanding, via the processor, a simultaneous deployment of a drogue parachute and a main parachute upon separation of the ejection seat from the aircraft, the simultaneous deployment being between 0 and 150 milliseconds from one another; and
    commanding, via the processor, separation of the drogue parachute after a time threshold measured from the simultaneous deployment, wherein the time threshold is between 100 milliseconds and 400 milliseconds.

2. The article of manufacture of claim 1, wherein the operations further comprise determining the aircraft altitude and the aircraft speed are within a predetermined zone.

3. The article of manufacture of claim 2, wherein the predetermined zone comprises an aircraft speed range between 25 knots and 300 knots and an aircraft altitude range between 0 feet (0 meters) and 20,000 feet (6,096 meters).

4. The article of manufacture of claim 3, wherein a first threshold speed to be considered within the predetermined zone decreases or stays a same speed as the aircraft altitude or the ejection altitude increases.

5. The article of manufacture of claim 1, wherein the simultaneous deployment is between 0 milliseconds and 100 milliseconds.

6. The article of manufacture of claim 1, wherein the operations further comprise deploying the drogue parachute prior to deploying the main parachute.

7. The article of manufacture of claim 1, wherein the operations further comprise determining, via the processor, the ejection seat has separated from the aircraft prior to the simultaneous deployment.

8. An ejection seat, comprising:
    a seat back;
    a drogue parachute stowed in or on the seat back;
    a main parachute stowed in or on the seat back;
    a processor; and
    a tangible, non-transitory computer-readable storage medium having instructions stored thereon that, in response to execution by the processor, cause the processor to perform operations comprising:

determining, via the processor, whether an aircraft is within a predetermined zone, the predetermined zone including a speed range and an altitude range, commanding, via the processor, simultaneous deployment of the drogue parachute and the main parachute from the seat back upon separation of the ejection seat from the aircraft in response to determining the aircraft is within the predetermined zone, the simultaneous deployment being between 0 and 150 milliseconds from one another; and commanding, via the processor, separation of the drogue parachute after a time threshold measured from the simultaneous deployment, wherein the time threshold is between 100 milliseconds and 400 milliseconds.

9. The ejection seat of claim 8, wherein the operations further comprise:
receiving, via the processor, sensor data from at least two sensors; and
determining, via the processor, an aircraft speed or ejection seat speed and an altitude of the aircraft or the ejection seat based on the sensor data.

10. The ejection seat of claim 8, wherein the operations further comprise determining whether an aircraft speed or an ejection seat speed and an altitude of the aircraft or the ejection seat are within the predetermined zone prior to ejection of the ejection seat.

11. An aircraft comprising:
an ejection seat, including:
a first sensor;
a second sensor; and
a drogue parachute stowed in or on the ejection seat;
a main parachute stowed in or on the ejection seat;
a processor in electronic communication with the first sensor and the second sensor;
a tangible, non-transitory computer-readable storage medium having instructions stored thereon that, in response to execution by the processor, cause the processor to perform operations comprising:
determining, via the processor and based on sensor data received from the first sensor and the second sensor, whether the aircraft or the ejection seat is within a predetermined zone, the predetermined zone including a speed range and an altitude range,
commanding, via the processor, simultaneous deployment of the drogue parachute and the main parachute from the ejection seat upon separation of the ejection seat from the aircraft in response to determining the aircraft or the ejection seat is within the predetermined zone, the simultaneous deployment being between 0 and 150 milliseconds from one another; and
commanding, via the processor, deployment of only the main parachute in response to determining the aircraft is in a second zone having a speed less than a speed threshold of the speed range and an altitude less than a maximum altitude of the altitude range.

12. The aircraft of claim 11, wherein the operations further comprise commanding, via the processor, separation of the drogue parachute after a time threshold measured from the simultaneous deployment.

13. The aircraft of claim 11, wherein the operations further comprise releasing the drogue parachute first, severing the drogue parachute, and releasing the main parachute just prior or just after severing the drogue parachute in response to determining the aircraft is in a third zone.

14. The aircraft of claim 11, wherein the first sensor is a static pressure sensor and the second sensor is a dynamic pressure sensor.

15. The aircraft of claim 14, wherein the operations further comprise:
determining, via the processor, an equivalent airspeed of the aircraft or the ejection seat based on a delta between a first pressure data received from the dynamic pressure sensor and the static pressure sensor;
determining, via the processor, the altitude of the aircraft based on a second pressure data received from the static pressure sensor; and
determining, via the processor, whether the aircraft is in the predetermined zone based on the altitude and the speed of the aircraft.

16. An article of manufacture including a tangible, non-transitory computer-readable storage medium having instructions stored thereon that, in response to execution by a processor, cause the processor to perform operations comprising:
receiving, via the processor, an ejection command for ejecting an ejection seat from an aircraft;
determining, via the processor, an aircraft altitude or ejection altitude and an aircraft speed or ejection seat speed;
determining the aircraft altitude and the aircraft speed are within a predetermined zone, wherein the predetermined zone comprises an aircraft speed range between 25 knots and 300 knots and an aircraft altitude range between 0 feet (0 meters) and 20,000 feet (6,096 meters), and wherein a first threshold speed to be considered within the predetermined zone decreases or stays a same speed as the aircraft altitude or the ejection altitude increases; and
commanding, via the processor, a simultaneous deployment of a drogue parachute and a main parachute upon separation of the ejection seat from the aircraft, the simultaneous deployment being between 0 and 150 milliseconds from one another.

17. An aircraft comprising:
an ejection seat, including:
a first sensor including a static pressure sensor;
a second sensor including a dynamic pressure sensor; and
a drogue parachute stowed in or on the ejection seat;
a main parachute stowed in or on the ejection seat;
a processor in electronic communication with the first sensor and the second sensor;
a tangible, non-transitory computer-readable storage medium having instructions stored thereon that, in response to execution by the processor, cause the processor to perform operations comprising:
determining, via the processor and based on sensor data received from the first sensor and the second sensor, whether the aircraft or the ejection seat is within a predetermined zone, the predetermined zone including a speed range and an altitude range, and
commanding, via the processor, simultaneous deployment of the drogue parachute and the main parachute from the ejection seat upon separation of the ejection seat from the aircraft in response to determining the aircraft or the ejection seat is within the predetermined zone, the simultaneous deployment being between 0 and 150 milliseconds from one another.

* * * * *